July 14, 1942.  A. T. GREGORY  2,289,959
COOLING SYSTEM FOR ENGINES
Filed July 17, 1940  2 Sheets-Sheet 1
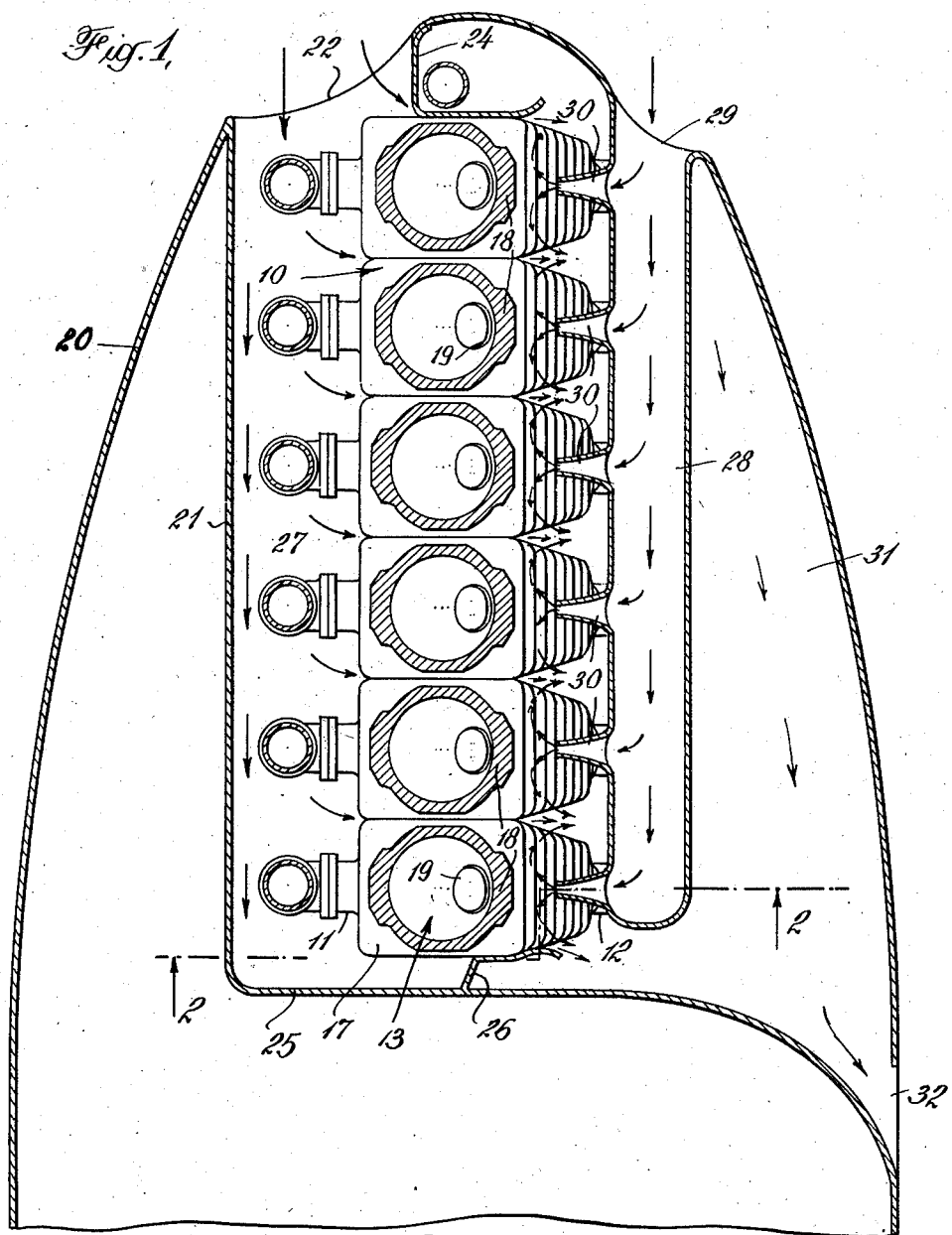
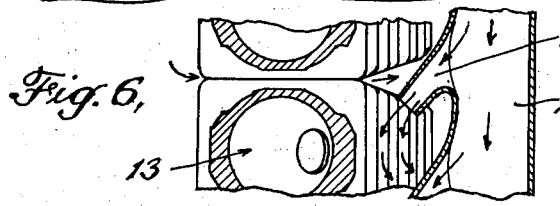
INVENTOR
Alfred T. Gregory
BY
ATTORNEYS July 14, 1942.   A. T. GREGORY   2,289,959
COOLING SYSTEM FOR ENGINES
Filed July 17, 1940   2 Sheets-Sheet 2
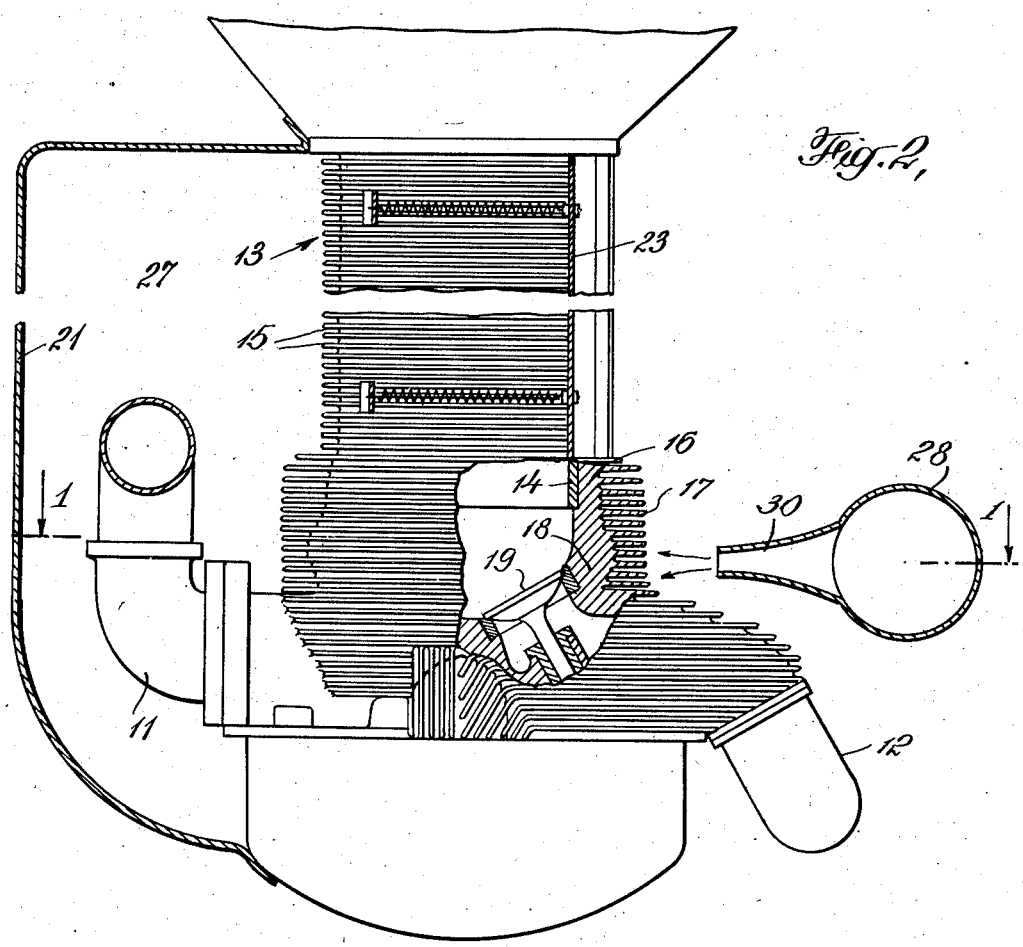
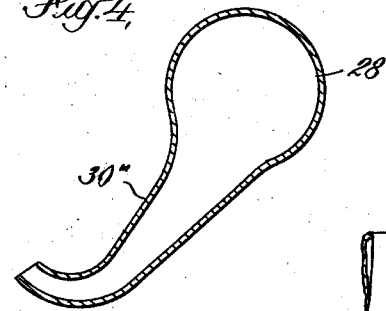
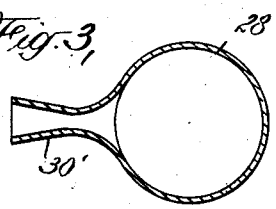
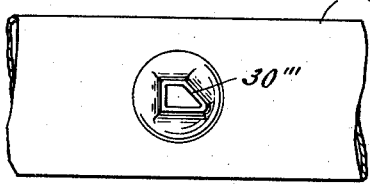
INVENTOR
Alfred T. Gregory
BY
ATTORNEYS Patented July 14, 1942

2,289,959

UNITED STATES PATENT OFFICE 2,289,959

COOLING SYSTEM FOR ENGINES

Alfred T. Gregory, Farmingdale, N. Y., assignor to Fairchild Engine and Airplane Corporation, Farmingdale, N. Y., a corporation of Maryland Application July 17, 1940, Serial No. 345,962

8 Claims. (Cl. 123—171)

This invention relates to engine cooling systems and has particular reference to a system for air-pressure cooling selected parts of the cylinders of aeronautical engines, although the invention is not limited to that use.

It is common practice to cool aeronautical engines by flowing air under pressure over the cylinders from an air scoop which collects a portion of the air stream under such conditions that a substantial static pressure builds up therein, with the result that there is a uniform distribution and steady flow of air under pressure over the engine cylinders.

This arrangement is generally satisfactory, but as pointed out in my Patent No. 2,152,043, issued March 28, 1939, this uniform distribution of the air under pressure is usually effected without regard to the unequal heating of the various portions of the cylinders, and, particularly where an engine operates under extremely high output conditions, additional air flow is required over certain parts of the engine in order to adequately cool it. One way of solving the problem is disclosed in said patent, where the cylinders are provided with air jackets having openings at selected points through which jets of air impinge upon corresponding portions of the engine cylinders, and the present invention is similarly directed to selectively cooling certain hotter portions of the cylinders which require additional cooling air in order to be effectively cooled, especially under high output operation of the engine.

In accordance with the present invention, a selective air pressure cooling system, preferably adapted for aeronautical engines, is provided in which the main static pressure air cooling system is supplemented with one or more auxiliary air scoops for collecting a portion of the air stream independently of the main scoop, the air collected in the auxiliary scoop being diverted in the form of high velocity air jets on selected portions of the cylinder, such as on the cylinder head. For in-line engines, the main air scoop is preferably positioned on the intake side of the engine cylinder bank and the auxiliary scoop or scoops are positioned at the exhaust side of the engine cylinder bank, whereby the air jets from the auxiliary scoop or scoops are directed upon hotter portions located at the exhaust side of the engine. As in the case of the main scoop, the plurality of jets of the auxiliary scoop have a gross area less than the area of the intake opening thereof, so that a substantial static pressure is built up and maintained under all operating conditions. By shaping the jet nozzles to conform to the configuration of the area to be cooled or to the configuration of the engine, the auxiliary cooling air may be supplied at any selected point for the described purpose.

It will be seen that with the selective air-pressure cooling system of this invention, the intake side of the cylinder bank, which is the cooler side, is normally cooled from the main air scoop in accordance with usual practice, whereas the air trapped under pressure in the auxiliary scoop or scoops is directed on the cylinders at high velocity at points requiring additional cooling, and is metered to various points on the cylinders in order to equalize the cooling of the different cylinders throughout the engine. The new system otherwise provides an auxiliary cooling means for use in conjunction with the usual cooling arrangement to the end that all parts of the engine cylinders are provided with a sufficient volume of cooling air to secure effective cooling, regardless of the normal cooling limitations of the engine or the output requirements thereof.

For a more complete understanding of the invention, reference may be had to the accompanying drawings, in which:

Figure 1 is a horizontal section through a six-cylinder inverted in-line aeronautical engine, as seen along the line 1—1 of Fig. 2, and illustrates the air-cooling system of this invention;

Fig. 2 is an end elevation of a cylinder head and the cam shaft housing of the engine as seen along the line 2—2 of Fig. 1, showing the main and auxiliary air scoops in section and a portion of the cylinder head in section;

Figs. 3 and 4 are transverse sections through the auxiliary scoop showing various modified forms of nozzle therefor;

Fig. 5 illustrates a nozzle outlet shaped to the configuration of the area to be cooled; and Fig. 6 is a fragmentary longitudinal section through an auxiliary scoop with diagonal nozzles.

Referring to Fig. 1 of the drawings, numeral 10 designates an inverted in-line aeronautical engine having a bank of six cylinders 13 provided with intake pipes 11 and exhaust pipes 12 leading thereto and therefrom. The barrels of the cylinders 13 have the usual spaced horizontal cooling fins 15, and the cylinder heads 16 are likewise provided with horizontal cooling fins 17 of different shape and arrangement, as is illustrated in Figs. 1 and 2. Each cylinder head 16 has a thickened wall portion 18 adjacent the exhaust valve 19, which is one of the hottest portions of the engine cylinder and one of the most difficult to cool adequately because of the limited space available for cooling fins and its relative inaccessibility. The thickened cylinder head portion 18 collects heat from the adjacent thinner wall portions, shown in Fig. 1, the heat collected by thickened portion 18 being then dissipated in a manner to be described.

The engine 10 is enclosed in a streamlined cowling 20 and the intake side thereof is provided with an air scoop 21 having a large air intake opening 22 and being closed at the bottom, top, and rear, as shown. The cylinders 13 are arranged so that their fins are substantially in edgewise engagement and the inter-cylinder spaces are provided at the exhaust side of the engine with baffles 23 which substantially close the inter-cylinder spaces except for air leakage ports provided between the edges of the baffles 23 and the adjacent cylinder barrels 14.

The fins of the forward cylinder of the engine 10 are engaged by the partition wall 24 so as to confine the air between the wall 24 and the wall of the corresponding cylinder 13. The rear wall 25 of the scoop 21 is turned inwardly at 26 in engagement with the fins of the cylinder, so as to confine the air between the wall and the corresponding cylinder 13. The enlarged cylinder heads 16 leave only narrow air leakage ports between the closely spaced adjacent walls thereof.

Although numerous, the gross area of these ports leading from the interior of the scoop 21 is, because of their individual small areas, considerably less than the area of the intake opening 22 of the scoop 21, so that the chamber 27 thus formed within scoop 21 is substantially closed. Accordingly, the high velocity air stream entering the scoop 21 is trapped therein and consequently builds up a considerable static pressure within chamber 27 as the airplane moves through the air, the degree of static pressure depending upon the relative velocity of movement between the airplane and the air stream, and on the ratio in area between the intake opening 22 and the gross area of the outlets therefrom between the adjacent cylinder heads 16, the cylinder walls and baffles 23, 24 and 26, and the like. Accordingly, air leaks from within scoop chamber 27 through these ports under considerable pressure and velocity, thus creating a flow over and along the walls of the cylinders 13, thereby cooling them effectively.

Positioned at the exhaust side of the engine 10 is an auxiliary air scoop 28 of generally tubular shape, having an air intake opening 29 at its forward end directed in the direction of travel of the airplane for collecting a portion of the airstream, and being closed at its rear end. The auxiliary scoop 28 is provided with a series of spaced lateral nozzles 30, one for each cylinder 13, as shown particularly in Fig. 1. The gross area of the discharge openings of all nozzles 30 is less than the area of the intake opening 29 of the auxiliary air scoop 28, so that a substantial air pressure builds up within the auxiliary scoop 28 and the air issues from nozzles 30 at considerable pressure and velocity.

As shown particularly in Fig. 2, each nozzle 30 of auxiliary scoop 28 is directed upon one of the hottest portions of the corresponding cylinder head 16, namely, the area adjacent the exhaust valve 19. Because the static pressure is substantially constant throughout scoop 28, the volume and velocity of the air supplied to each nozzle are constant. It will be observed that this area is the surface of the thickened wall portion 18 and that the latter is accordingly continuously flushed by the jet of air, so that the heat collected by the thickened wall portion 18 from the adjacent thinner wall portions of the cylinder head is directly carried off by the jet air stream.

The air issuing from nozzles 30 impinges at high velocity and in considerable volume upon the thickened portion 18, is deflected therefrom in the manner indicated by the arrows in Fig. 1 and mingles with the air issuing from the inter-cylinder spaces. Although the initial course of the jet air is counter to the inter-cylinder air, it does not interfere with the flow of the latter by reason of the positioning of the nozzles at a point between the normal course of the inter-cylinder air at each side of the corresponding cylinder and by reason of low static pressure in the engine compartment 31. Also, the jet air is deflected in the direction of the inter-cylinder air and the two streams mingle under the influence of the lower pressure in 31, as is indicated by the arrows in Fig. 1, so that there is no interference between the streams.

More than one auxiliary scoop 28 may be provided for similarly directing jets of high velocity cooling air upon other portions of the cylinder 13, depending upon cooling requirements, the supply of cooling air being, of course, ample, since it is collected from the air stream and is not limited by the space between the cylinders.

As shown in Fig. 3, in some cases the nozzles 30' of auxiliary scoop 28 may be Venturi-shaped, so as to provide a more efficient orifice and to allow the air to expand somewhat before it impinges upon the cylinder or cylinder head wall against which it is directed. Thus, the volume of air is not reduced but its velocity is reduced and this arrangement is particularly useful where a large volume of supplementary cooling air is desired in a location where a high velocity jet might interfere with the normal air flow across the cylinder walls from the main scoop 21, for example. Although nozzles 30 and 30' are shown as directed radially from the auxiliary scoop 28, they may be curved or otherwise bent to direct auxiliary cooling air on more inaccessible portions of the cylinder, or in cases where the space requirements do not permit the positioning of the auxiliary scoop 20 at a point adjacent the areas to be cooled, as indicated by nozzle 30'' in Fig. 4, for example. Also, although circular section nozzles are usually sufficient, the nozzle outlets may be flat, polygonal, or peculiarly-shaped to conform to the configuration or outline of the area to be cooled thereby, as indicated by the shape of the outlet of nozzle 30''' in Fig. 5.

As shown in Fig. 6, the nozzles 30$^a$, of any of the cross-sectional shapes illustrated in Figs. 1, 3, 4 or 5, or the like, may be arranged diagonally so as to direct the pressure air from auxiliary scoop 28 across the cylinders 13, whereby a greater area of cylinder wall may be effectively cooled.

Operation of the engine cooling system of this invention will be readily understood from the foregoing description, the main air scoop 21 providing effective cooling for the engine cylinders as a whole and being preferably positioned on the intake or cooler side of the engine 10, since this side is more readily cooled by normal methods, whereas the auxiliary scoop 28 provides supplemental cooling air for hotter parts of the cylinder and is preferably positioned on the exhaust side of the engine 10, so as to cool those parts by more efficient means. The spent cooling air issuing from the inter-cylinder spaces and that issuing from the nozzles 30, 30', 30'', or 30ᵃ of the auxiliary scoop 28, after impinging upon the selected portions of the cylinders 13, is collected within the cowling 31 and exhausted through the exit gill 32, which is made sufficiently large to accommodate the increased volume of cooling air provided by the auxiliary scoop 28.

The engine cooling system provided by the main scoop 21 and the auxiliary scoop 28 permits operation of the engine at extremely high outputs without excessive overheating, and for such use it is preferred that the main air scoop 21 be positioned on the intake or cooler side of the engine with the auxiliary scoop 28 on the exhaust or hotter side of the engine, so that even at extremely high outputs the intake side of the engine is not allowed to over-heat and the exhaust side thereof is specially cooled in the manner described. Nevertheless, it may be desirable under certain conditions to reverse the arrangement by positioning the main scoop 21 on the exhaust side and the auxiliary scoop 28 on the intake side of the engine. In some instances, it may be also desirable to position the auxiliary scoop 28 on the same side of the engine as the main scoop 21. Furthermore, more than one auxiliary scoop 28 may be positioned on the same side of the engine or on both sides thereof, and other modifications may be made within the scope of the appended claims, it being understood that the invention is not limited to the preferred embodiments illustrated and described herein.

I claim:

1. In combination with an aeronautical engine having a plurality of cylinders and adapted to be located in an air stream, an air scoop having an intake opening for directing a portion of the air stream into said scoop, and a plurality of nozzles projecting from said scoop and having restricted outlet openings directed upon predetermined portions of said cylinders for impinging corresponding jets of cooling air thereon, said nozzles having a total area of all said restricted outlet openings thereof which is less than the area of the air intake opening of said scoop to create a resistance to air flow through said scoop, developing a substantial static air pressure therein providing substantially constant high velocity air streams impinging on said cylinder portions from said nozzle openings.

2. In combination with an aeronautical engine having a plurality of cylinders and adapted to be located in an air stream, an air scoop having an intake opening for directing a portion of the air stream into said scoop, and a plurality of converging nozzles projecting from said scoop and having restricted outlet openings directed upon predetermined portions of said cylinders for impinging corresponding jets of cooling air thereon, said nozzles having a total area of all said restricted outlet openings thereof which is less than the area of the air intake opening of said scoop to create a resistance to air flow through said scoop, developing a substantial static air pressure therein providing substantially constant high velocity air streams impinging on said cylinder portions from said nozzle openings.

3. In combination with an aeronautical engine having a plurality of cylinders and adapted to be located in an air stream, an air scoop having an intake opening for directing a portion of the air stream into said scoop, and a plurality of Venturi nozzles projecting from said scoop and having restricted outlet openings directed upon predetermined portions of said cylinders for impinging corresponding jets of cooling air thereon, said nozzles having a total area of all said restricted outlet openings thereof which is less than the area of the air intake opening of said scoop to create a resistance to air flow through said scoop, developing a substantial static air pressure therein providing substantially constant high velocity air streams impinging on said cylinder portions from said nozzle openings.

4. In combination with an aeronautical engine having a plurality of cylinders and adapted to be located in an air stream, an air scoop having an intake opening for directing a portion of the air stream into said scoop, and a plurality of nozzles projecting from said scoop having restricted outlet openings conforming to the shape of and directed upon predetermined portions of said cylinders for impinging corresponding jets of cooling air thereon, said nozzles having a total area of all said restricted outlet openings thereof which is less than the area of the air intake opening of said scoop to create a resistance to air flow through said scoop, developing a substantial static air pressure therein providing substantially constant high velocity air streams impinging on said cylinder portions from said nozzle openings.

5. In combination with an aeronautical engine having a plurality of cylinders and adapted to be located in an air stream, an air scoop having an intake opening for directing a portion of the air stream into said scoop, and a plurality of elongated nozzles projecting from said scoop and shaped to conform to the contour of the adjacent portion of the engine and having restricted outlet openings directed upon predetermined portions of said cylinders remote from said scoop for impinging corresponding jets of cooling air thereon, said nozzles having a total area of all said restricted outlet openings thereof which is less than the area of the air intake opening of said scoop to create a resistance to air flow through said scoop, developing a substantial static air pressure therein providing substantially constant high velocity air streams impinging on said cylinder portions from said nozzle openings.

6. In combination with an aeronautical engine having a plurality of cylinders and adapted to be located in an air stream, an air scoop having an intake opening for directing a portion of the air stream into said scoop, and a plurality of nozzles projecting from said scoop and having restricted outlet openings directed upon predetermined portions of said cylinders having thickened wall portions for impinging corresponding jets of cooling air thereon, said nozzles having a total area of all said restricted outlet openings thereof which is less than the area of the air intake opening of said scoop to create a resistance to air flow through said scoop, developing a substantial static air pressure therein providing substantially constant high velocity air streams impinging on said cylinder portions from said nozzle openings.

7. In combination with an aeronautical engine having a plurality of cylinders, restricted air passages adjacent the cylinders, and adapted to be located in an air stream, a main air scoop enclosing one side of said cylinders having an air intake opening for directing a portion of the air stream into said scoop for diversion through said passages over the adjacent cylinder walls to cool the same, at least one auxiliary air scoop having an air intake opening for directing a portion of the air stream into said auxiliary scoop, and a plurality of nozzles extending from said auxiliary air scoop and having restricted outlet openings directed upon predetermined portions of said cylinders intermediately of the said cylinder passages, said nozzles having a total area of all said restricted outlet openings which is less than the area of the air intake opening of said scoop to create a resistance to air flow through said scoop, developing a substantial static air pressure therein providing from said nozzles substantially constant high velocity streams of cooling air on said cylinder portions independently of the cooling air traversing said passages from said main air scoop.

8. In combination with an aeronautical engine having a plurality of cylinders and adapted to be located in an air stream, a tubular air scoop arranged along one side of said cylinders and having an intake opening for directing a portion of the air stream into said scoop, a plurality of nozzles projecting from said scoop and arranged at an acute angle to the plane of said cylinders and having restricted outlet openings for impinging corresponding jets of cooling air diagonally across the corresponding surfaces of the cylinders, said nozzles having a total area of all said restricted outlet openings which is less than the area of the air intake opening of said scoop to create a resistance to air flow through said scoop, developing a substantially static air pressure therein providing substantially constant high velocity air streams impinging on said cylinders from said nozzles.

ALFRED T. GREGORY.